US009948527B1

(12) United States Patent
Bryan et al.

(10) Patent No.: US 9,948,527 B1
(45) Date of Patent: Apr. 17, 2018

(54) SYNTHETIC RESOURCE RECORDS

(71) Applicant: Google LLC, Mountain View, CA (US)

(72) Inventors: Brent Anthony Piller Bryan, Mountain View, CA (US); Jonathan Mack, Mountain View, CA (US); Roberto Ramalho Fischer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 249 days.

(21) Appl. No.: 14/585,744

(22) Filed: Dec. 30, 2014

Related U.S. Application Data

(60) Provisional application No. 62/016,445, filed on Jun. 24, 2014.

(51) Int. Cl.
*H04L 12/26* (2006.01)
*G06F 17/30* (2006.01)
(52) U.S. Cl.
CPC ........ *H04L 43/04* (2013.01); *G06F 17/30345* (2013.01)
(58) Field of Classification Search
CPC ........................... H04L 43/04; G06F 17/30345
USPC .......................................................... 709/224
See application file for complete search history.

(56) References Cited

U.S. PATENT DOCUMENTS

| | | | | |
|---|---|---|---|---|
| 6,895,431 B1 * | 5/2005 | Bero | ....................... | H04L 41/12 709/220 |
| 6,910,047 B1 * | 6/2005 | Boucher | ........... | G06F 17/30345 |
| 8,667,074 B1 * | 3/2014 | Farkas | .................... | H04L 51/12 709/206 |
| 2012/0185236 A1 * | 7/2012 | Blodgett | .............. | G06F 17/289 704/2 |
| 2013/0339510 A1 * | 12/2013 | Douglas | .............. | H04L 41/5077 709/223 |
| 2014/0006641 A1 * | 1/2014 | James | ................. | H04L 61/1552 709/245 |
| 2014/0258349 A1 * | 9/2014 | Meltzer | ............. | G06F 17/30194 707/827 |
| 2015/0207887 A1 * | 7/2015 | Feinleib | ................. | H04L 67/16 709/219 |
| 2016/0057100 A1 * | 2/2016 | Blinn | .................. | H04L 61/1511 709/219 |

* cited by examiner

*Primary Examiner* — Tauqir Hussain
*Assistant Examiner* — Steve Lin
(74) *Attorney, Agent, or Firm* — Lerner, David, Littenberg, Krumholz & Mentlik, LLP

(57) ABSTRACT

Provided are methods and systems for using synthetic resource records to configure and manage web applications and various online services. A user is provided with the ability to setup a single synthetic resource record for their domain such that all of the associated dependent resource records are automatically configured and added to the domain as well. The methods and systems provided utilize synthetic resource records as a way of logically grouping resource records into "human readable" sets of resource records. Through synthetic resource records, users are able to address common configuration issues without having to know the technical specifications of associated zone files or resource records. Additionally, users can complete a variety of configuration tasks related to setting-up web applications without having to look-up resource record values from external sites (e.g., from the domain host).

18 Claims, 9 Drawing Sheets

| Resource Record 200a | | | |
|---|---|---|---|
| Name 210a | Type 220a | TTL 230a | Data 240a |

| Resource Record 200b | | | |
|---|---|---|---|
| Name 210b | Type 220b | TTL 230b | Data 240b |

· · ·

| Resource Record 200n | | | |
|---|---|---|---|
| Name 210n | Type 220n | TTL 230n | Data 240n |

FIG. 2

Domains          400

My Domains    brentbryan.com ← 405

Transfer in

| Website | Email | Settings | Advanced |

Billing    Synthetic Records    430      435

410 →   App Engine ▼   Subdomain   .brentbryan.com →   App Engine ID   Add

425

App Engine
@.brentbryan.com → hostedringshirt    Delete   Edit

415

App Engine
www.brentbryan.com → hostedringshirt    Delete   Edit

Forwarding
apps.brentbryan.com → http://www.domain.com    Delete   Edit

Resource Records

420    @   A ▼   1H   IPv4 address   +   Add

| NAME | TYPE | TTL | DATA | | |
|---|---|---|---|---|---|
| @ | MX | 1h | 10 gmr-smtp-in.l.domain.com. | Delete | Edit |
| | | | 10 alt1.gmr-smtp-in.l.domain.com. | | |
| | | | 10 alt2.gmr-smtp-in.l.domain.com. | | |
| | | | 10 alt3.gmr-smtp-in.l.domain.com. | | |
| | | | 10 alt4.gmr-smtp-in.l.domain.com. | | |
| blog | CNAME | 1h | ghs.domain.com. | Delete | Edit |
| g2qte7a.. | CNAME | 1h | gv-joyhr3kc672gjx.dv.domainhosted.com. | Delete | Edit |

FIG. 4

Domains 500

My Domains   brentbryan.com ← 505

Transfer in

| Website | Email | Settings | Advanced |

Billing

Synthetic Records   530                       535

510 → | App Engine ▼ | legal | .brentbryan.com → | hostedringshirt | Add |

525 ↗

| App Engine<br>@.brentbryan.com → hostedringshirt | ⌄ | Delete | Edit |

| App Engine<br>www.brentbryan.com → hostedringshirt | ⌄ | Delete | Edit |

| Forwarding<br>apps.brentbryan.com → http://www.domain.com | ⌄ | Delete | Edit |

515 → | App Engine      540<br>legal.brentbryan.com → hostedringshirt | ⌄ | Delete | Edit |

Resource Records

520 → | @ | A ▼ | 1H | IPv4 address | + | Add |

| NAME | TYPE | TTL | DATA | | |
|---|---|---|---|---|---|
| @ | MX | 1h | 10 gmr-smtp-in.l.domain.com. | Delete | Edit |
| | | | 10 alt1.gmr-smtp-in.l.domain.com. | | |
| | | | 10 alt2.gmr-smtp-in.l.domain.com. | | |
| | | | 10 alt3.gmr-smtp-in.l.domain.com. | | |
| | | | 10 alt4.gmr-smtp-in.l.domain.com. | | |
| blog | CNAME | 1h | ghs.domain.com. | Delete | Edit |
| g2qtc7a.. | CNAME | 1h | gv-joyhr3kc672gjx.dv.domainhosted.com. | Delete | Edit |

FIG. 5

Domains 600

My Domains    brentbryan.com

Transfer in

| Website | Email | Settings | Advanced |

Billing

Synthetic Records

| App Engine ▼ | legal | .brentbryan.com → | hostedringshirt | Add |

---

App Engine
@.brentbryan.com → hostedringshirt    Delete   Edit

App Engine
www.brentbryan.com → hostedringshirt    Delete   Edit

Forwarding
apps.brentbryan.com → http://www.domain.com    Delete   Edit

615 → App Engine
legal.brentbryan.com → hostedringshirt    Delete   Edit

| NAME | TYPE | TTL | DATA |
|---|---|---|---|
650 → | legal | CNAME | 1h | ghs.domainhosted.com |

Resource Records

620 → | @ | A ▼ | 1H | IPv4 address | + Add |

| NAME | TYPE | TTL | DATA | | |
|---|---|---|---|---|---|
| @ | MX | 1h | 10 gmr-smtp-in.l.domain.com. | Delete | Edit |
| | | | 10 alt1.gmr-smtp-in.l.domain.com. | | |
| | | | 10 alt2.gmr-smtp-in.l.domain.com. | | |
| | | | 10 alt3.gmr-smtp-in.l.domain.com. | | |
| | | | 10 alt4.gmr-smtp-in.l.domain.com. | | |
| blog | CNAME | 1h | ghs.domain.com. | Delete | Edit |
| g2qte7a.. | CNAME | 1h | gv-joyhr3kc672gjx.dv.domainhosted.com. | Delete | Edit |

FIG. 6

| Domains | | | | | 700 |
|---|---|---|---|---|---|
| My Domains | brentbryan.com | | | | |
| Transfer in | Website | Email | Settings | Advanced | |
| Billing | Synthetic Records | | | | |

App Engine ▼   legal   .brentbryan.com →   hostedringshirt   Add

760 → App Engine
@.brentbryan.com → hostedringshirt                           Delete   Edit

| NAME | TYPE | TTL | DATA |
|---|---|---|---|
| @ | A | 1h | 216.239.32.21 |
| | | | 216.239.34.21 |
765 → 
| | | | 216.239.36.21 |
| | | | 216.239.38.21 |
| @ | AAAA | 1h | 2001:4860:4802:32::15 |
| | | | 2001:4860:4802:34::15 |
770 →
| | | | 2001:4860:4802:36::15 |
| | | | 2001:4860:4802:38::15 |

App Engine
www.brentbryan.com → hostedringshirt                         Delete   Edit Forwarding
apps.brentbryan.com → http://www.domain.com                  Delete   Edit

715 → App Engine
legal.brentbryan.com → hostedringshirt                       Delete   Edit

| NAME | TYPE | TTL | DATA |
|---|---|---|---|
750 → | legal | CNAME | 1h | ghs.domainhosted.com |

Resource Records

720 →   @   A ▼   1H   IPv4 address   +   Add

| NAME | TYPE | TTL | DATA | | |
|---|---|---|---|---|---|
| @ | MX | 1h | 10 gmr-smtp-in.l.domain.com. | Delete | Edit |
| | | | 10 alt1.gmr-smtp-in.l.domain.com. | | |

FIG. 7

| Domains | | | | | | 800 |
|---|---|---|---|---|---|---|
| My Domains | brentbryan.com | | | | | |
| Transfer in | Website | Email | Settings | Advanced | | |
| Billing | Synthetic Records | | | | | |

860 → [Apps ▼]  ☑ Email  ▼☑ Subdomains  
                          885 ↗       ☑ calendar   ☑ plus               [Add]  
                                      ☑ docs      ☑ sheets  
                                      ☑ storage   ☑ sites  
                          890 →   ☑ groups   ☑ slides  
                                      ☑ mail       ☑ start  
                                      ☑ video chat  ☑ vault > Email forward                                           View setting  [Delete]

FIG. 8

SYNTHETIC RESOURCE RECORDS

The present application claims priority to U.S. Provisional Patent Application Ser. No. 62/016,445, filed Jun. 24, 2014, the entire disclosure of which is hereby incorporated by reference.

BACKGROUND

A zone file is a file that describes a domain or network zone, which is a subset of the hierarchical domain name structure of the domain name system (DNS). Zone files typically include mappings between domain names and IP addresses and/or other resources. Such mappings are typically organized in the form of resource records.

Such resource records need to be established, maintained, and regularly updated for web applications hosted on networked computing platforms such as cloud computing systems. This, in turn, may require that the application or a user offering the application maintain or have access to an ongoing and updated listing of the domain or network names, IP addresses, and other resources in a cloud computing system to ensure that the application does not experience outage or malfunction as a result of system changes or updates.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing web applications to users. More specifically, aspects of the present disclosure relate to using synthetic resource records to configure and manage web applications.

One embodiment of the present disclosure relates to a computer-implemented method comprising: creating a synthetic resource record for a web application associated with an Internet domain, wherein the synthetic resource record includes a domain name system (DNS) specification defined for the web application and a service specification defined for the web application, and wherein the service specification includes information indicating an intent of a user associated with the Internet domain; receiving information indicating a change to a configuration of the web application for the Internet domain; and updating the synthetic resource record for the web application based on the received information and the intent of the user as indicated in the service specification.

In another embodiment, the method further comprises sending the DNS specification defined for the web application to a DNS server, and sending the service specification defined for the web application to a configuration server and to at least one web application associated with the synthetic resource record.

In another embodiment, updating the synthetic resource record for the web application based on the received information includes updating the DNS specification defined for the web application, and the method further comprises sending the updated DNS specification to the DNS server.

In yet another embodiment, the method further comprises using the service specification to configure one or more specific actions on the domain, on a subdomain of the domain, or both.

In still another embodiment, the method further comprises receiving, from a service owner associated with the web application, information indicating a change to the web application, and updating the synthetic resource record for the web application based on the information received from the service owner and the intent of the user as indicated in the service specification.

In another embodiment, the method further comprises providing the user with access to a web console for specifying information associated with configuring the web application for one or more Internet domains.

Another embodiment of the present disclosure relates to a system comprising one or more processors, and a non-transitory computer-readable medium coupled to the one or more processors having instructions stored thereon that, when executed by the one or more processors, cause the one or more processors to perform operations comprising: creating a synthetic resource record for a web application associated with an Internet domain, wherein the synthetic resource record includes a domain name system (DNS) specification defined for the web application and a service specification defined for the web application, and wherein the service specification includes information indicating an intent of a user associated with the Internet domain; receiving information indicating a change to a configuration of the web application for the Internet domain; and updating the synthetic resource record for the web application based on the received information and the intent of the user as indicated in the service specification.

In another embodiment, the one or more processors of the system are caused to perform further operations comprising: sending the DNS specification defined for the web application to a DNS server; and sending the service specification defined for the web application to a configuration server and to at least one web application associated with the synthetic resource record.

In yet another embodiment, the one or more processors of the system are caused to perform further operations comprising updating the DNS specification defined for the web application, and sending the updated DNS specification to the DNS server.

In yet another embodiment, the one or more processors of the system are caused to perform further operations comprising using the service specification to configure one or more specific actions on the domain, on a subdomain of the domain, or both.

In still another embodiment, the one or more processors of the system are caused to perform further operations comprising: receiving, from a service owner associated with the web application, information indicating a change to the web application; and updating the synthetic resource record for the web application based on the information received from the service owner and the intent of the user as indicated in the service specification.

In another embodiment, the one or more processors of the system are caused to perform further operations comprising: providing the user with access to a web console for specifying information associated with configuring the web application for one or more Internet domains.

Yet another embodiment of the present disclosure relates to one or more non-transitory computer readable media storing computer-executable instructions that, when executed by one or more processors, causes the one or more processors to perform operations comprising: creating a synthetic resource record for a web application associated with an Internet domain, wherein the synthetic resource record includes a domain name system (DNS) specification defined for the web application and a service specification defined for the web application, wherein the service specification includes information indicating an intent of a user associated with the Internet domain, and wherein the service specification is usable to configure one or more specific actions on the domain; receiving information indicating a change to the configuration of the web application for the Internet domain; and updating the synthetic resource record for the web application based on the received information and the intent of the user as indicated in the service specification.

In one or more other embodiments, the methods and systems described herein may optionally include one or more of the following additional features: the information indicating a change to the configuration of the web application includes a subdomain of the Internet domain and an identifier for the web application, and/or the web console includes one or more user interface screens identifying synthetic resource records associated with one or more web applications configured for the one or more Internet domains.

Embodiments of some or all of the processor and memory systems disclosed herein may also be configured to perform some or all of the method embodiments disclosed above. Embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

FIG. 2 is a block diagram illustrating example resource records according to one or more embodiments described herein.

FIG. 4 is an example user interface of a domains console for setting-up and managing synthetic resource records according to one or more embodiments described herein.

FIG. 5 is an example user interface of a domains console for setting-up and managing synthetic resource records and illustrates the addition of a synthetic resource record according to one or more embodiments described herein.

FIG. 6 is an example user interface of a domains console for setting-up and managing synthetic resource records and includes one synthetic resource record in an expanded form to show corresponding resource records added therewith according to one or more embodiments described herein.

FIG. 7 is an example user interface of a domains console for setting-up and managing synthetic resource records and includes multiple synthetic resource records in expanded form to show corresponding resource records added therewith according to one or more embodiments described herein.

FIG. 8 is an example user interface of a domains console for setting-up and managing synthetic resource records and includes a synthetic resource record with various options associated with a service that may be optionally selected by a user according to one or more embodiments described herein.

Figure 1:
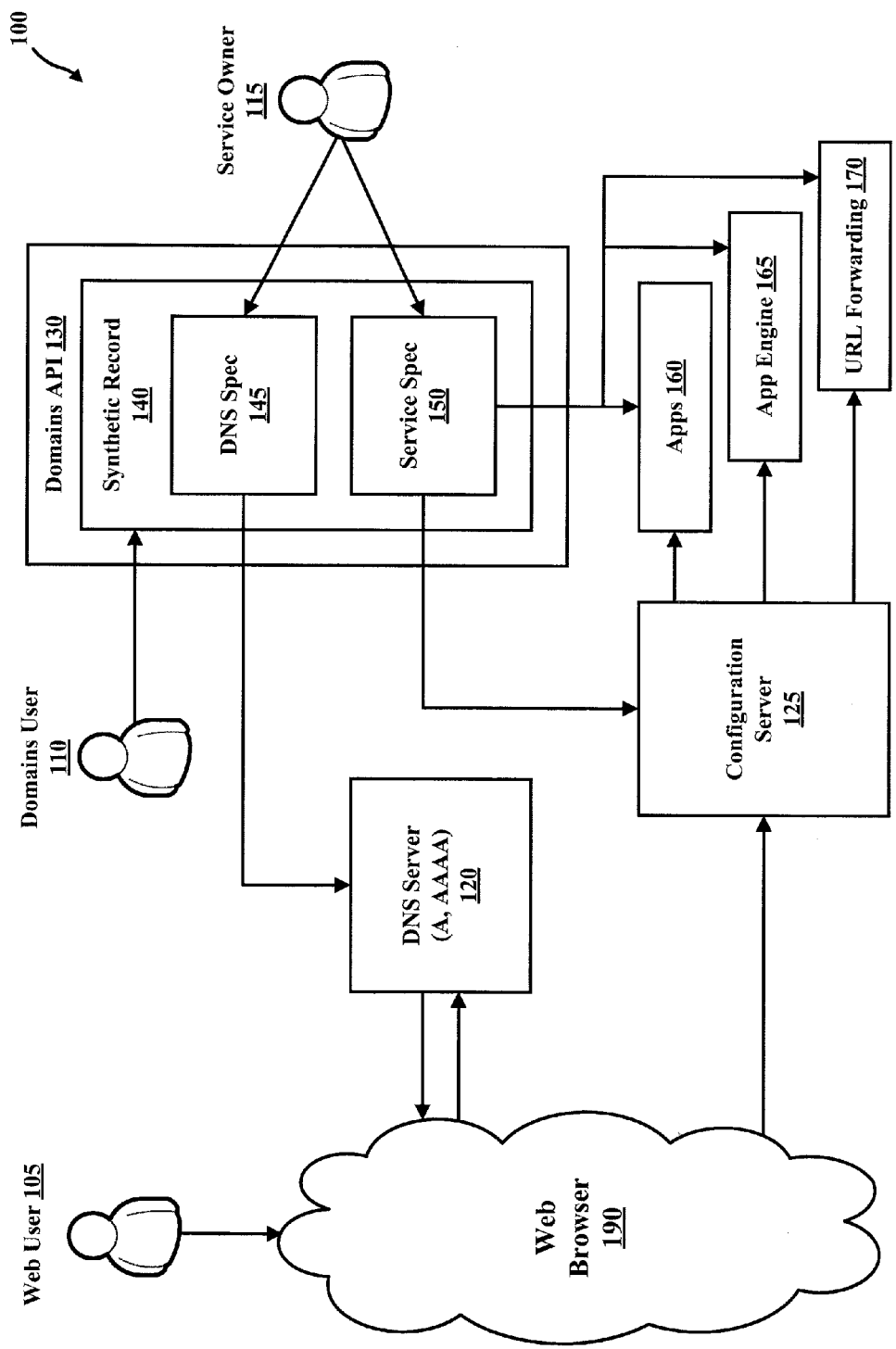
FIG. 1 is a block diagram illustrating an example system and surrounding network environment for using synthetic resource records to configure and manage web applications according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Occasionally, a user may need to modify the DNS settings associated with his or her domain in order to setup various web applications and/or services (e.g., to setup an e-mail service with the e-mail address of the user's organization, to customize the address of a collaborative website, and the like). In such scenarios, the user may modify their domain's DNS settings by changing and/or adding various types of DNS resource records (e.g., A records, AAAA records, MX records, CNAME records, etc., each of which will be described in greater detail below) based on the configuration requirements for the desired web application.

As will be further described herein, rather than requiring users to configure multiple resource records (e.g., adding and setting values for CNAME records, MX records, A records, etc.) to setup a web application, the methods and systems of the present disclosure provide users with the ability to setup (e.g., add, configure, etc.) a single synthetic resource record such that all of the associated dependent resource records may be automatically created and added as well.

By providing users (e.g., domains users, service owners, etc.) with the ability to utilize synthetic resource records, the methods and systems of the present disclosure significantly reduce the complexity of configuring web applications and various cloud-based services. For example, with synthetic resource records, users no longer need to know the exact value(s) of resource records underlying their applications. Synthetic resource records also extend the functionality of resource records by allowing users to specify additional configuration information that may not be expressible with conventional resource records. For example, in accordance with at least one embodiment of the present disclosure, a "URL Forwarding" synthetic resource record may be implemented which automatically sets the correct underlying resource records and also configures a URL redirection service for the associated URL.

As will be described in greater detail below, the methods and systems of the present disclosure utilize synthetic resource records as a way of logically grouping resource records into "human readable" sets of resource records. In addition, by specifying additional information users are able to complete a configuration task for a web application from within a Domains API (application programming interface), which may include a user console and which may also sometimes be referred to herein as a "Domains Console", "Domains Dashboard", "Domains Admin Console", or simply "Domains" (for brevity). It should be understood that numerous other terms or phrases may also be used to refer to the user console of the present disclosure in addition to or instead of the example terms mentioned above.

The methods and systems described herein provide users with the ability to address common configuration issues without having to know the technical specifications of associated zone files or resource records. Additionally, users can complete a variety of configuration tasks related to setting-up web applications without having to look-up resource record values from external sites (e.g., from the domain host).

Within the context of the present disclosure, the following terms will have meanings consistent with the definitions set forth below.

Resource: a physical or logical component of a computing system or computing environment or a data item or data collection stored in or accessed by a computing system or computing environment. A "resource" can be specifically identified for purposes of access, processing, tracking, control, or other uses within a system by means of a data structure, logical object, or other structured information representing the resource and/or its inherent or associated properties. Examples of resources include: running processes, applications, physical storage locations, physical machines, virtual machines, processors, process threads, processor time, storage devices, disk drives, interface cards, machines, power, power supply components, network devices, memory, storage space, network bandwidth, storage access time, databases, database entries, and other system objects and/or components.

Record: a logical representation of a resource in a computing system or computing environment. A record may include information about the resource, its logical or physical location or access point in the computing system or computing environment, and information about a resource type associated with the resource.

A/AAAA Record: an Address record (or "A" record, and in the case of IPv6, "AAAA" record), which is also known as a "host record," maps a domain to the physical IP address of the computer (e.g., server) hosting that domain. Internet traffic uses the A record to find the computer hosting a domain's DNS settings. Once at that server, traffic follows the domain's other DNS records to find related mail servers and other services. The value of an A record is always an IP address, and multiple A records can be configured for one domain name. A records can be used on any domain or subdomain. For example, when using various business or enterprise web services, a user can modify their domain's A records to enable a "naked" domain address (e.g., yourdomain.com is the naked domain for www.yourdomain.com).

CNAME Record: a Canonical Name record (or "CNAME" record) is a type of DNS resource record that maps an alias name to a true or canonical domain name. CNAME records are typically used to map a subdomain such as www or mail to the domain hosting that subdomain's content. For example, one CNAME record can map the web address www.example.com to the actual web site for the domain example.com, while another CNAME record may direct mail.example.com to the e-mail sign-in page for example.com. When using various web services (e.g., business or enterprise services), a user may need to add a CNAME record to their domain's DNS settings to, for example, customize a web address, verify domain ownership, or reset the administrator password. CNAME records may also be created for a domain's other services as well. A CNAME record is typically stored in the domain's DNS settings as a pair of values, where one value identifies the alias the record is being created for (e.g., a subdomain like www or mail), and the other value identifies the domain the alias should point to. Among other things, CNAME records allow a user to reference another host without having to depend on the IP address of the other host. Each CNAME record associates a service with a domain name, not a physical IP address. The physical IP address is instead identified by the domain's "A" resource record. Thus, if a user's IP address changes, the user need only change the "A" record, and not each of the CNAME records.

MX Record: Mail Exchange records (or "MX" records) are DNS settings associated with a domain that direct the domain's mail to the servers hosting the mail accounts of the users associated with the domain. Conventionally, these settings are managed by the domain host. To make sure mail always gets delivered, a user typically creates MX records for multiple servers, all of which can deliver mail to users. Therefore, if one server is down, mail may be routed to another server instead. The user can determine the order in which the servers are tried by assigning priorities to the servers (e.g., using values like 10, 20, 30, and so on, where the lowest value gets highest priority). For example, if the domain example.com has two MX records, 10mail1.example.com and 20mail2.example.com, each corresponding to a different mail server, mail will first be delivered to 10mail1.example.com because it has the lowest number priority. If that server is down, mail will be redirected to 20mail2.example.com, and so on. If different MX records have the same priority, one server is chosen arbitrarily.

In accordance with at least some embodiments, a resource record may refer to an IP address associated with a DNS server, such as, for example, an IPv4 address or an IPv6 address. However, a resource record according to the present disclosure may also refer to a "synthetic resource record." As will be described in greater detail below, among numerous other advantages and functionalities, a synthetic resource record enables a user to group resource records into a logical group, thereby reducing the complexity associated with configuring and managing such resource records and the web applications related thereto.

FIGS. 4-7 illustrate example user interfaces, some of which may be used in various embodiments of the disclosure to implement one or more features of the example systems and methods described below and illustrated in FIGS. 1-3. Various aspects of the example user interface screens shown in FIGS. 4-7 may be referenced in the descriptions of the components and/or processes shown in FIGS. 1-3 for purposes of example and/or illustration. As such, the user interfaces shown in FIGS. 4-7 are at least partially described in the following paragraphs with additional details of each user interface screen being provided in the paragraphs subsequent to the descriptions of FIGS. 1-3.

FIG. 1 illustrates an example system and surrounding network environment for utilizing synthetic resource records to configure and manage web applications. In accordance with one or more embodiments described herein, the example web application configuration and management system 100 may include Domains API 130, DNS Server 120, Configuration Server 125, and various cloud-based applications and services (e.g., Apps 160, App Engine 165, and Forwarding 170).

Domains User 110 may access Domains Console 130 and create a Synthetic Record 140. The Synthetic Record 140 may include two pieces (e.g., components, elements, etc.), a DNS Spec 145 and a Service Spec 150. In accordance with at least one embodiment described herein, DNS Spec 145 may include the rules for the Synthetic Record 140 and Service Spec 150 may include various configuration information, such as, for example, server configuration information. In addition, as will be further described below, the Service Spec 150 may include information about the relation to the DNS Spec 145.

The DNS Spec 145 may contain information to route requests to the affected zones to the correct gateway or hosts. For example, in accordance with at least one embodiment of the present disclosure, the DNS Spec 145 for an Apps 160 synthetic record (e.g., Synthetic Record 140) may include information to route requests for various applications or services (e.g., cloud storage, calendar, etc.) associated with Apps 160 to the correct set of machines of the cloud services provider that services Apps 160 content. The Service Spec 150 may be used to configure the Apps 160 gateway to ensure that requests from the affected domain/zone are routed to the correct Apps 160 instance. That is, Service Spec 150 ensures that when John Doe from example.com requests access to cloud storage, John Doe is taken to the instance of Apps 160 serving example.com for which John Doe has access, and not any other instance of Apps 160 serving example.com or some other instance of Apps that John Doe may or may not have access to.

It should be noted that when the Domains User 110 creates the Synthetic Record 140, the DNS Spec 145 and Service Spec 150 are also created as elements thereof. The creation of the DNS Spec 145 and Service Spec 150 may be transparent to the Domains User 110. The DNS Spec 145 may be sent (e.g., pushed) from Domains API 130 to DNS Server 120, and the Service Spec 150 may be sent from Domains API 130 to Configuration Server 125 and also to the various cloud-based services and applications (e.g., Apps 160, App Engine 165, and Forwarding 170) that may be associated with the particular Synthetic Record 140.

Web User 105 may utilize Web Browser 190 to access DNS Server 120. Upon accessing DNS Server 120, the Web Browser 190 may look up a resource record and request additional information about the resource record. The type of resource record in DNS Server 120 that may be the subject of the request from Web Browser 190 may be, for example, an "A" record, an "AAAA" record, a "CNAME" record, or any of the various other types of resource records known to those skilled in the art, some of which are described in detail above. With some web applications or cloud-based services, for example, once this resolution (e.g., determining or identifying a resource record in the DNS Server 120) has been performed, a corresponding IP address is obtained by (or returned to) Web Browser 190. Web Browser 190 then sends a request (e.g., a resource lookup request) to the Configuration Server 125. For example, suppose a user is trying to resolve "mail.example.com". The user may first determine which domain name registry (e.g., Registrar "X") should be used to look-up "example.com". The user may then go to Registrar X and ask where "mail.example.com" is. Once the user obtains the value for "mail.example.com" from Registrar X, the user may perform the lookup and the result is Configuration Server 125. In this manner, Configuration Server 125 acts either as a redirect server or as a proxy (and returns the data directly).

Part of the Service Spec 150 may include instructions for the Redirect Server 125 about where the Redirect Server 125 should send the requests received from Web Browser 190. For example, the Redirect Server 125 may be instructed to take a CNAME record and forward the record to any services (e.g., Apps 160, App Engine 165, Forwarding 170, cloud storage, etc.) should appropriately take it.

In accordance with at least one embodiment described herein, a synthetic record (e.g., Synthetic Record 140) may have one or more preferences associated with it. For example, a synthetic record created for a particular application (e.g., App Engine 165) may specify various preferences for that application. For example, the synthetic record may indicate that the application should use service "A", service "B", service "N", and so on.

Service Owner 115 may control what the DNS Spec 145 actually is and also define what the Service Spec 150 language looks like. Because Synthetic Record 140 wraps these two components (DNS Spec 145 and Service Spec 150) together, Service Owner 115 may, for example, change the DNS Spec 145 without the need to involve Domains User 110 and, in accordance with at least one embodiment, without Domains User 110 being aware of the change. For instance, suppose a domain user (e.g., Domains User 110) sets up their domain to reference a web service using an A, AAAA, or CNAME record. At some later time, Service Owner 115 decides to move their service (e.g., for cost and/or availability reasons). In such a scenario, under conventional approaches, the Service Owner 115 needs to contact all of the domain users (e.g., all of Domains Users 110) and ask them to update their records. However, with the synthetic resource records described in accordance with the present disclosure, since the records (e.g., Synthetic Records 140) include or convey the intent of the user (e.g., of Domains User 110), the Service Owner 115 can contact the provider or operator of Domains API 130 to update the records of all of the Domains Users 110 to which the change is applicable without effecting or contacting each of the Domains Users 110 individually.

With the synthetic records (e.g., Synthetic Records 140) described in accordance with embodiments of the present disclosure, each synthetic record corresponds to a single intent of the user (e.g., Domains User 110). For example, there may be different synthetic records for each of the website hosting services partnered with a given cloud services provider. As such, it can be determined that users with synthetic records for a particular one of these website hosting service partners (e.g., Website Host "A") are attempting to setup their domain to point to a website hosted by Website Host "A". For example, suppose a user (e.g., Domains User 110) wants cloud storage to go to a different IP address. Because the intent of what the user wants is known (e.g., the user wants cloud storage to go to a different IP address), the necessary changes to the corresponding resource records may be made in a manner that is transparent to the user. In a conventional approach, the user would have had to obtain the correct IP address from, for example, a help center associated with the domain host, and then type the IP address in for cloud storage. However, in such a conventional approach cloud storage may not be able to determine whether the user entered the new IP address because the user wishes to use cloud storage or because the user wishes to use some other service.

The synthetic resource record described herein is designed to capture the intent of what the user wants with respect to various cloud-based services, and make it easier for the user to configure the services that the user wants and/or already has. For example, suppose a user wishes to setup email for a web application (e.g., Apps 160). In order to do so, the user will need to configure their domain's MX records to direct the domain's mail flow to the appropriate mail servers. Under a conventional approach, the user would need to proceed through a series of steps in order to configure their domain's MX records. Such a series of steps may include, for example, the following: (i) the user signs in to their domain's account at the domain host; (ii) the user sorts through the documentation of the mail provider to find the correct settings; (iii) the user locates the page for updating their domain's DNS records; (iv) the user locates the MX records for their domain; (v) the user updates the existing MX records (and/or creates new MX records) to point to the desired mail servers by entering MX record values associated with (e.g., specific to) the mail servers; (vi) the user deletes any MX records not pointing to the desired mail servers or assigns such records a lower priority than the MX records associated with desired mail servers; and (vii) the user saves the changes made to the MX records and waits until the changes take effect. It should also be noted that any typos in the settings as provided in the documentation of the mail provider may not be readily apparent to the user, and thus are the cause of much user frustration.

However, rather than proceeding through all of the steps described above, in accordance with one or more embodiments of the present disclosure, the user can setup, for example, email for their web application by specifying a minimal amount of information necessary to indicate (e.g., convey) their intent. For example, as will be described in greater detail below with respect to the example user interface screens illustrated in FIGS. 4-8, the user's intent (e.g., that he or she wishes to setup email for their web application) may be determined based on the user specifying the type of service desired (e.g., email), a subdomain, and the name (e.g., ID) of the particular web application to which the service should be added.

For example, with reference to the example user interface screen 800 shown in FIG. 8, synthetic records are not just tied to the desired action (e.g., email) of the user, but also to the provider. Therefore, a user (e.g., Domains User 110) who wishes to set up email with Apps (e.g., Apps 160) may select the "Apps" synthetic record from dropdown menu 860, and then select (or check/click) "Email" 885 to drop all of the required MX records 890 on their domain.

From the point-of-view of a domains user (e.g., Domains User 110), synthetic resource records allow the domains user to setup their domain, add any desired cloud-based services to their domain, and continue to use their domain with minimal action being needed on their part. From the Service Owner's point-of-view, the methods and systems of utilizing synthetic records in accordance with the present disclosure allow the Service Owner to improve a given service associated with a Domains User based on the captured (e.g., determined) intent of the Domains User. In other words, once the Service Owner determines the intent of the Domains User, the Service Owner can continue to use this captured intent to improve the associated service without input or action from the Domains User (e.g., the Service Owner may improve the service "under the covers" or "behind the scenes").

In addition to improving the performance of the service as experienced by (or from the perspective of) the web user (e.g., Web User 105), utilizing synthetic resource records in the manner described herein also reduces the complexity (increases the efficiency) of managing the service from the point-of-view of the service owner (e.g., Service Owner 115). For example, by using synthetic records the service owner no longer needs to guess at what the domain user's (e.g., Domain User 110) intent is. Under conventional approaches, when the service owner of a web service makes a change to or updates the service specification (e.g., Service Spec 150) for the web service, the service owner typically needs to contact the domain users who have added the service to their domains and request (sometimes through multiple attempts) that the domain users update all applicable resource records for the service accordingly.

In describing various embodiments and features of the present disclosure, reference is sometimes made to operations performed by a "user" and data (e.g., resource records, DNS specification, applications, etc.) provided to or received from a "user." It should be understood that in the implementation context, operations performed by a "user" and/or data received from or provided to a "user" means operations performed by a "device of the user" and/or data received from/provided to a "device of the user" (a "user device"), the device being configured for operation or use by the user. As such, operations performed by a "user" and operations performed by a "user device", as well as data received from/provided to a "user" and data received from/provided to a "user device", may be used interchangeably at times for purposes of simplicity.

Figure 3:
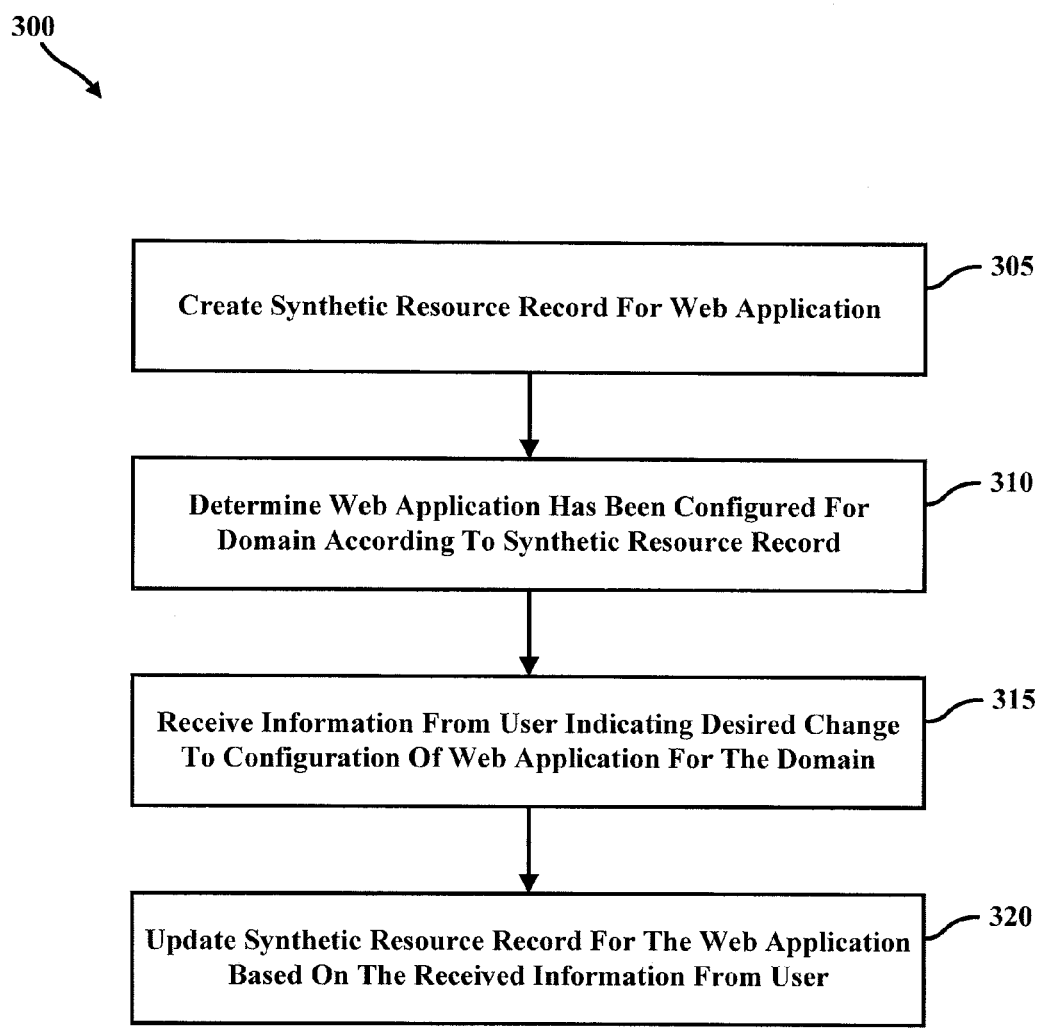
FIG. 3 is a flowchart illustrating an example method for using synthetic resource records to configure and manage web applications according to one or more embodiments described herein.

FIG. 3 illustrates an example process for using synthetic resource records to configure and manage web applications. In accordance with one or more embodiments described herein, the example process 300 may be performed by a web application configuration and management system similar to system 100 described above and illustrated in FIG. 1.

At block 305, a synthetic resource record may be created for a web application. For example, a service owner (e.g., Service Owner 115 in the example system 100 shown in FIG. 1) may define a synthetic resource record for a given web application or cloud-based service, where the synthetic resource record includes a logical grouping of resource records associated with the particular web application or service. In accordance with at least one embodiment described herein, the synthetic resource record that may be created at block 305 may include two information/data components (e.g., pieces, elements, parts, etc.), a DNS specification defined for the web application and a service specification defined for the web application (e.g., DNS Spec 145 and Service Spec 150 defined by Service Owner 115 in the example system 100 shown in FIG. 1). The DNS specification may include the rules for the synthetic resource record while the service specification may include configuration information such as, for example, server configuration information. For example, the DNS specification may contain "standard" A/AAAA/CNAME type records, which are provided by the service (not by the user). In addition, the service specification may include, for example, configuration information, such as which subdomains should be mapped where, or which AppEngine App should be served from a specific subdomain, and the like. Information such as this may not be readily available through a standard zone file, but may be needed, for example, to determine the user's intent.

In addition, although not illustrated as separate blocks, in accordance with one or more embodiments, the example process 300 may also include sending the DNS specification defined for the web application to an applicable DNS server (e.g., DNS Server 120 in the example system 100 shown in FIG. 1), and sending the service specification defined for the web application to a redirect server and to at least one web application associated with the synthetic resource record (e.g., to Redirect Server 125 and to one or more of Apps 160, App Engine 165, and URL Forwarding 170 in the example system 100 shown in FIG. 1).

In accordance with one or more embodiments of the present disclosure, defining the service specification for a web application or service may include selecting (e.g., designating, indicating, etc.) one or more options associated with the service that may selectively be enabled or disabled (e.g., turned on/off) by a user (e.g., Domains User 110, Service Owner 115, or both, in the example system 100 shown in FIG. 1). For example, with reference to the "Apps" synthetic record 860 in the example user interface screen shown in FIG. 8, the service owner of Apps (e.g., Service Owner 115 of Apps 160) may be able to select which options 890 are presented to a user (e.g., Domains User 110) and also what the default values for these options should be. The Domains User 110 may then be able to refine the selections (within the framework provided by the service owner).

At block 310, it may be determined that the web application has been configured for a domain in accordance with the synthetic resource record created at block 305. For example, at block 310 it may be determined that a user (e.g., Domains User 110 in the example system 100 shown in FIG. 1) has added the web application to a domain (e.g., website) associated with the user, and has configured the web application based on the service specification defined for the application (e.g., by Service Owner 115). For instance, a domains user may configure the service such that mail.mydomain.com goes to a particular e-mail application associated with a cloud-services provider, calendar.mydomain.com goes to a calendar application of the services provider, and the like.

At block 315, information may be received from a user associated with the domain for which the application was determined to be configured at block 310, where the information received indicates (e.g., conveys) a desired change to the configuration of the web application for the domain.

At block 320, the synthetic resource record created for the web application at block 305 may be updated based on the received information from the user at block 315. For example, in accordance with at least one embodiment, the DNS specification defined for the application may be updated based on the intent of the user as determined from the information received at block 315.

In addition, although not included in the example process illustrated in FIG. 3, once the synthetic resource record (e.g., the DNS specification defined for the web application) has been updated at block 320, the updated synthetic resources records may be sent (e.g., pushed) to the applicable DNS server.

As will be described in greater detail below with respect to the example user interface screens illustrated in FIGS. 4-8, in accordance with one or more embodiments of the present disclosure, a user associated with one or more Internet domains who has setup an account for their domains with a cloud-based services provider (e.g., an authorized administrator of such an account with the cloud-based services provider) may be provided with access to a Domains Console (e.g., Domains User 110 accessing Domains Console 130 in the example system 100 shown in FIG. 1) that allows the user to view a concise, logical representation of the resource records associated with their domains and also manage/configure such resource records in a straightforward and user-friendly manner.

As mentioned above, FIGS. 4-8 illustrate example user interface screens including components that may be used in implementing one or more of the various embodiments of the methods and systems described herein. The features and components of the illustrative user interface screens presented in FIGS. 4-8 are described in the context of example domain names (e.g., "brentbryan.com"), example web applications (e.g., "App Engine" and "Forwarding"), and example data/values/entries for various types of resource records. It should be understood that the particular subject-matter of the content contained in any of the example user interface screens shown in FIGS. 4-8, as well as the arrangement of any of the various components comprising these example user interfaces are for illustrative purposes only, and are not in any way intended to limit the scope of the present disclosure. It should also be noted that numerous other variations, types, combinations, and arrangements of user interface screens may also be used to implement certain features of the methods and systems described herein, in addition to or instead of the example user interfaces shown in FIGS. 4-8.

Included in each of the example user interface screens 400, 500, 600, and 700 is a "Resource Records" section 420, 520, 620, and 720, respectively, (identified by a broken-line box). The Resource Records section is included in the example user interface screens to aid in the understanding of the contents and structure of the example synthetic resource records shown therewith. It should be noted, however, that in accordance with one or more embodiments of the present disclosure, the domains console provided to a user may not include such a "Resource Records" section (or a component similar thereto) since such resource records may be automatically added for a domain through the setup of a synthetic resource record (e.g., synthetic resource records 415 in the example user interface 400 shown in FIG. 4).

FIG. 4 illustrates an example user interface 400 for a domains console in which a user may setup and manage (e.g., add, remove, edit, etc.) synthetic resource records for web applications added to one or more of their domains. In accordance with at least one embodiment described herein, the example user interface 400 may include, for a given domain 405 (e.g., brentbryan.com), synthetic resource records 415 that have been configured for web applications associated with the domain. A user may setup additional synthetic resource records 415 by entering/selecting certain information in the synthetic records setup 410 component in example user interface 400. For example, a user may configure a new synthetic resource record 415 by selecting a type of web application (e.g., Apps, App Engine, Forwarding, etc.) from the application dropdown menu 425, entering a subdomain in the "Subdomain" field 430, entering the name or ID 435 of the particular web application to which the entered subdomain should go, and selecting the "Add" button.

FIG. 5 is an example user interface 500 for a domains console illustrating the configuration of a new synthetic resource record. In the example user interface 500, synthetic resource record 515 has been added for the user's domain 505 using, for example, the synthetic records setup 510 component.

For example, suppose a user wishes to add a new "App Engine" domain. In accordance with at least one embodiment of the present disclosure, the user may do so by selecting "App Engine" from the application drop-down menu 525, entering subdomain "legal" in Subdomain field 530, and entering "hostedringshirt" as the App Engine ID 535 for the web application to which the entered subdomain should go.

FIG. 6 is an example user interface 600 illustrating a synthetic resource record 615 in an expanded form to show the corresponding resource records 650 that were configured (e.g., automatically) when the synthetic resource record 615 was configured (as described above with respect to the example user interface 500 shown in FIG. 5).

FIG. 7 is another example user interface 700 illustrating multiple synthetic resource records 715 and 760 each in an expanded form to show the corresponding resource records 750, 765, and 770 that were configured (e.g., automatically) when their respective synthetic resource record (715 or 760) was configured.

Figure 9:
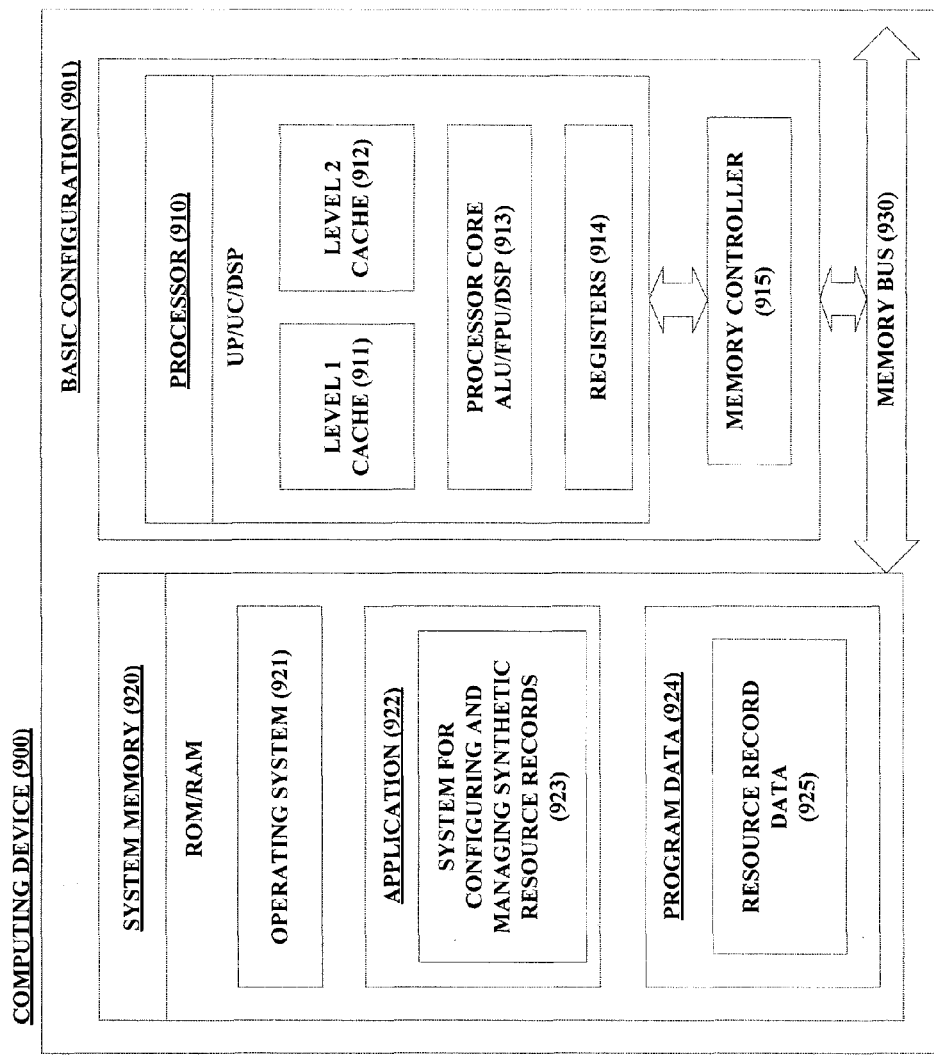
FIG. 9 is a block diagram illustrating an example computing device arranged for using synthetic resource records to configure and manage web applications according to one or more embodiments described herein.

FIG. 9 is a high-level block diagram of an exemplary computer (900) that is arranged for using synthetic resource records to configure and manage web applications in accordance with one or more embodiments described herein. In a very basic configuration (901), the computing device (900) typically includes one or more processors (910) and system memory (920). A memory bus (930) can be used for communicating between the processor (910) and the system memory (920).

Depending on the desired configuration, the processor (910) can be of any type including but not limited to a microprocessor (μP), a microcontroller (μC), a digital signal processor (DSP), or any combination thereof. The processor (910) can include one more levels of caching, such as a level one cache (911) and a level two cache (912), a processor core (913), and registers (914). The processor core (913) can include an arithmetic logic unit (ALU), a floating point unit (FPU), a digital signal processing core (DSP Core), or any combination thereof. A memory controller (916) can also be used with the processor (910), or in some implementations the memory controller (915) can be an internal part of the processor (910).

Depending on the desired configuration, the system memory (920) can be of any type including but not limited to volatile memory (such as RAM), non-volatile memory (such as ROM, flash memory, etc.) or any combination thereof. System memory (920) typically includes an operating system (921), one or more applications (922), and program data (924). The application (922) may include a system for configuring and managing synthetic resource records (923), which may be configured to provide users with the ability to setup (e.g., add, configure, etc.) a single synthetic resource record for a web application such that all of the associated dependent resource records for the web application are automatically configured as well. In accordance with at least one embodiment of the present disclosure, the system for configuring and managing synthetic resource records (923) significantly reduces the complexity of configuring web applications and various cloud-based services, and also extends the functionality of resource records by allowing users to specify additional configuration information that may not be expressible with conventional resource records.

Program Data (924) may include storing instructions that, when executed by the one or more processing devices, implement a system (923) and method for configuring and managing synthetic resource records. Additionally, in accordance with at least one embodiment, program data (924) may include resource record data (925), which may relate to zone files for a web application, including mappings between domain or network names and IP addresses and other resources associated with the web application. In accordance with at least some embodiments, the application (922) can be arranged to operate with program data (924) on an operating system (921).

The computing device (900) can have additional features or functionality, and additional interfaces to facilitate communications between the basic configuration (901) and any required devices and interfaces.

System memory (920) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of the device (900).

The computing device (900) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (900) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It should also be noted that in situations in which the systems and methods described herein may collect personal information about users, or may make use of personal information, the users may be provided with an opportunity to control whether programs or features associated with the systems and/or methods collect user information (e.g., information about a user's preferences). In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a server.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
creating, with one or more processors, a synthetic resource record for a web application associated with an Internet domain based on resource record data stored in one or more memories, wherein the synthetic resource record includes a domain name system (DNS) specification defined for the web application and a service specification defined for the web application, and wherein the service specification includes information indicating a cloud-based service configuration associated with the Internet domain;
providing the synthetic resource record for display;
receiving, through a user interface, information indicating a change to a configuration of the web application for the Internet domain, wherein the information indicating a change to the configuration of the web application includes a subdomain of the Internet domain and an identifier for the web application;
updating, with the one or more processors, the DNS specification for the web application based on the received information and the intent of the user as indicated in the service specification; and
sending the updated DNS specification to a DNS server.

2. The method of claim 1, further comprising:
sending the service specification defined for the web application to a configuration server and to at least one web application associated with the synthetic resource record.

3. The method of claim 1, further comprising:
using the service specification to configure one or more specific actions on the domain, on a subdomain of the domain, or both.

4. The method of claim 1, further comprising:
receiving, from a service owner associated with the web application, information indicating a change to the web application; and
updating the synthetic resource record for the web application based on the information received from the service owner and the intent of the user as indicated in the service specification.

5. The method of claim 1, further comprising:
providing the user with access to a web console for specifying information associated with configuring the web application for one or more Internet domains.

6. The method of claim 5, wherein the web console includes one or more user interface screens identifying synthetic resource records associated with one or more web applications configured for the one or more Internet domains.

7. A system comprising:
one or more processors; and
a non-transitory computer-readable medium coupled to said one or more processors having instructions stored thereon that, when executed by said one or more processors, cause said one or more processors to perform operations comprising:
creating a synthetic resource record for a web application associated with an Internet domain based on resource record data stored in one or more memories, wherein the synthetic resource record includes a domain name system (DNS) specification defined for the web application and a service specification defined for the web application, and wherein the service specification includes information indicating a cloud-based service configuration associated with the Internet domain;
receiving information indicating a change to a configuration of the web application for the Internet domain, wherein the information indicating a change to the configuration of the web application includes a subdomain of the Internet domain and an identifier for the web application;
updating the synthetic resource record for the web application based on the received information and the intent of the user as indicated in the service specification; and
sending the updated DNS specification to a DNS server.

8. The system of claim 7, wherein the one or more processors are caused to perform further operations comprising:
sending the service specification defined for the web application to a configuration server and to at least one web application associated with the synthetic resource record.

9. The system of claim 7, wherein the one or more processors are caused to perform further operations comprising:

using the service specification to configure one or more specific actions on the domain, on a subdomain of the domain, or both.

10. The system of claim 7, wherein the one or more processors are caused to perform further operations comprising:
   receiving, from a service owner associated with the web application, information indicating a change to the web application; and
   updating the synthetic resource record for the web application based on the information received from the service owner and the intent of the user as indicated in the service specification.

11. The system of claim 7, wherein the information indicating a change to the configuration of the web application includes a subdomain of the Internet domain and an identifier for the web application.

12. The system of claim 7, wherein the one or more processors are caused to perform further operations comprising:
   providing the user with access to a web console for specifying information associated with configuring the web application for one or more Internet domains.

13. The system of claim 12, wherein the web console includes one or more user interface screens identifying synthetic resource records associated with one or more web applications configured for the one or more Internet domains.

14. One or more non-transitory computer readable media storing computer-executable instructions that, when executed by one or more processors, causes the one or more processors to perform operations comprising:
   creating a synthetic resource record for a web application associated with an Internet domain based on resource record data stored in one or more memories, wherein the synthetic resource record includes a domain name system (DNS) specification defined for the web application and a service specification defined for the web application, wherein the service specification includes information indicating a cloud-based service configuration associated with the Internet domain, and wherein the service specification is usable to configure one or more specific actions on the domain;
   receiving information indicating a change to a configuration of the web application for the Internet domain, wherein the information indicating a change to the configuration of the web application includes a subdomain of the Internet domain and an identifier for the web application;
   updating the synthetic resource record for the web application based on the received information and the intent of the user as indicated in the service specification; and
   sending the updated DNS specification to a DNS server.

15. The one or more non-transitory computer readable media of claim 14, wherein the computer-executable instructions, when executed by the one or more processors, cause the one or more processors to perform further operations comprising:
   sending the service specification defined for the web application to a configuration server and to at least one web application associated with the synthetic resource record.

16. The one or more non-transitory computer readable media of claim 14, wherein the information indicating a desired change to the configuration of the web application includes a subdomain of the Internet domain and an identifier for the web application.

17. The one or more non-transitory computer readable media of claim 14, wherein the computer-executable instructions, when executed by the one or more processors, cause the one or more processors to perform further operations comprising:
   providing the user with access to a web console for specifying information associated with configuring the web application for one or more Internet domains.

18. The method of claim 1, wherein the service specification further includes at least one of configuration information or information regarding a relationship to the DNS specification.

* * * * *